UNITED STATES PATENT OFFICE.

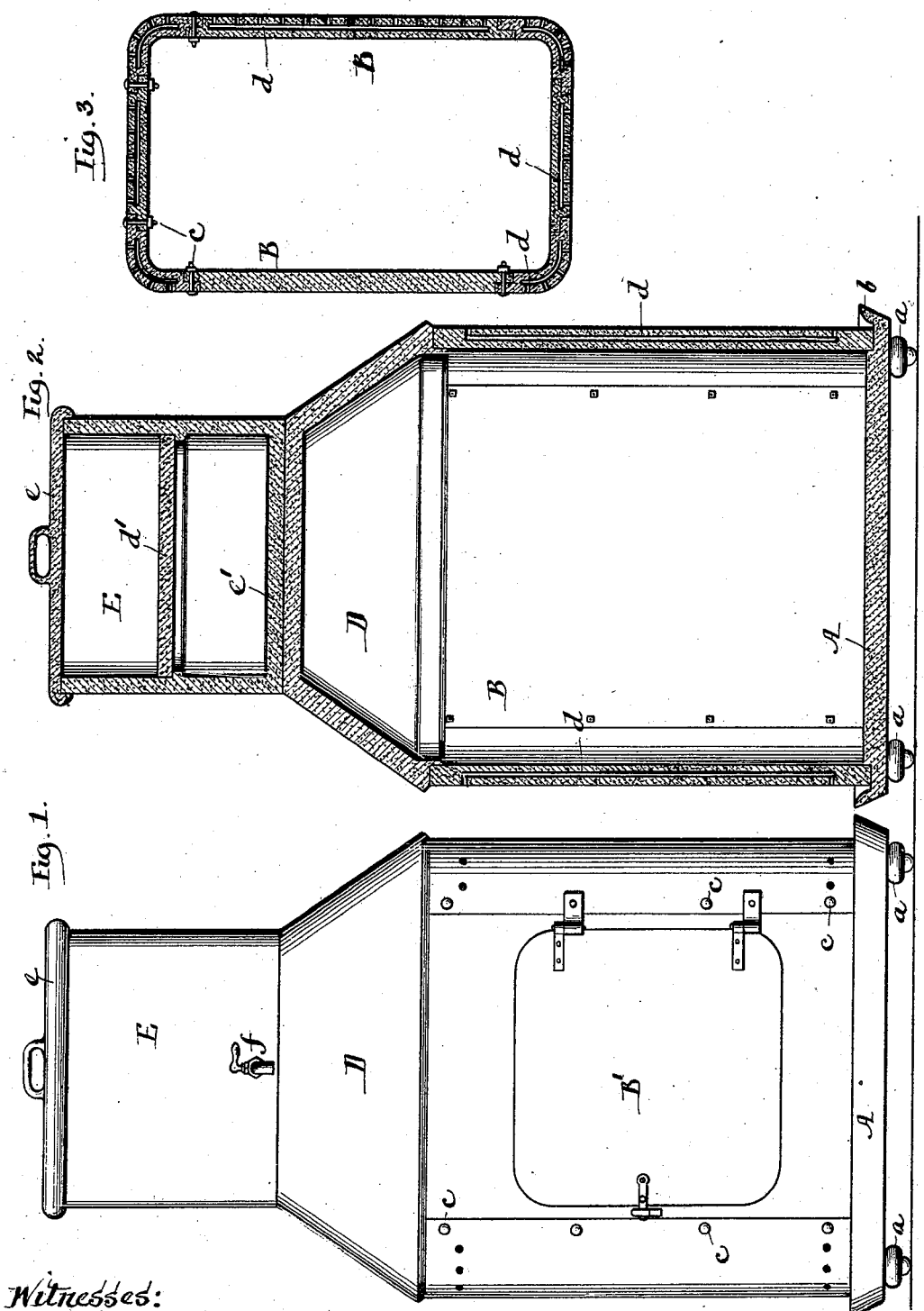

JOHN B. MILLER, OF CHICAGO, ILLINOIS, ASSIGNOR OF TWO-THIRDS TO BYRON E. LA DOW AND FRANK C. RUTAN, OF SAME PLACE.

REFRIGERATOR.

SPECIFICATION forming part of Letters Patent No. 670,374, dated March 19, 1901.

Application filed April 4, 1900. Serial No. 11,440. (No model.)

*To all whom it may concern:*

Be it known that I, JOHN B. MILLER, a resident of Chicago, Cook county, Illinois, have invented certain new and useful Improvements in Refrigerators, of which the following is a full, clear, and exact description.

The invention relates to chill-rooms, coolers, or other forms of inclosed apparatus used for storing and preserving meats, vegetables, and like perishable goods.

The invention designs to construct the surrounding walls of the apparatus from porous baked clay or equivalent material homogeneous in texture, but capable of distributing water or other suitable liquid by capillary attraction throughout the mass. On exposure to the air the water constantly evaporates, markedly reducing the temperature at the interior of the apparatus, while the loss of water is made good by constant seepage-supply from a storage-reservoir in capillary contact with the refrigerator-walls.

The nature of the improvements will appear in detail from the description following and be more particularly pointed out by claims at the conclusion thereof.

On the drawings, Figure 1 is an elevation view of a simple form of refrigerator embodying the invention. Fig. 2 is a view in vertical, and Fig. 3 a view in horizontal, section.

Mounted upon the common base A, having supports or feet $a$ and an overflow ledge or rim $b$, are the side walls B, conveniently made up of several slabs or sections united by a rabbet-joint and secured together by bolts $c$ or other fasteners. A door B' affords access to the interior. A series of cotton strands or wicks embedded in the slabs when these are molded may be advantageously used. On baking the slabs the cotton burns out, leaving the passages or chambers $d$ distributed over a large area as aids for more rapid evaporation. The passages or chambers $d$ are provided at the top and bottom with openings to the atmosphere formed in the same manner, which afford means for the circulation of air through such passages or chambers. By this means the evaporative surface of a porous wall of given area is much greater and the refrigerating effect correspondingly more than would be the case if the walls were not provided with such chambers.

A cap-piece or cover D rests upon the side walls and is surmounted by the water-tank E, having the filter-diaphragm $d$, lid $e$, and tap-cock $f$. On raising the lid $e$ a suitable supply of water may be admitted to the upper part of the tank and passing through the filter-septum $d'$ may be drawn off in cooled state at cock $f$, if desired.

As shown in the drawings, the filter-tank E is preferably independent and removable from the top of cap-piece D. The cap-piece D is preferably provided with a flat portion, so that the flat bottom of the filter E may be placed in direct contact with such top piece D. By this construction since the top and side walls of the provision-chamber and the filter are all formed of porous material the water to be evaporated will be drawn through the porous material of the filter by capillary attraction and evenly disseminated therefrom throughout the top and side walls of the provision-chamber.

Ordinarily the water percolates in large part through the bottom $e'$ of the tank into the adjacent cap-piece D and proceeds thence by capillary flow down the side walls of the apparatus, emerging in slight measure at the catch-rim $b$ of the vessel-bottom. To better insure this film-like distribution of the water within the pores or interstices of the refrigerator proper, it may be desirable at times to apply a coat of bitumen or other impervious paint as a band one or two inches wide about the lower part of tank E. The presence of the band tends to better direct the seepage internally from tank to cap-piece, despite the break in continuity of the capillary passages or pores. A like band may be applied on the outer face of the cap-piece at its junction with the side walls of the apparatus, if desired.

It is seen that the cooling effect on the contents of the refrigerator is directly due to the evaporation of water over a large area or exposed surface in the porous bottom, sides, and top of the apparatus. A low even temperature always prevails and becomes more marked by so much as the temperature of the surrounding air is higher. It will be observed that the water-supply of the porous wall of the storage-chamber is filtered by passing through the filter-disk $d'$ and the porous walls of the tank E. Any sediment which may be contained in the water is thus prevented from plugging the pores of the walls of the storage-chamber, and thereby rendering the same less pervious to water and correspondingly reducing the refrigerating effect.

Obviously the details of structure can be varied according to the mechanic's skill without essential departure from the invention.

Having thus described my invention, what I claim as new, and desire to secure by Letters Patent, is—

1. In refrigerators, the combination with the bottom, of the side walls formed of slabs separably united and having passages open to the air formed directly therein, a cap-piece or cover surmounting said walls to complete the inclosure and an independent water-tank resting above in direct contact with said cap-piece; the several parts being formed of porous material pervious to water so that the same may be evenly disseminated from the tank downward throughout the mass, substantially as described.

2. A refrigerator comprising a wall of porous material adapted to absorb water or like liquid and expose the same to evaporation, passages or chambers formed directly in said porous material and means for supplying to said porous wall the liquid to be evaporated.

3. A refrigerator comprising a storage-chamber having a wall of porous material adapted to absorb water or like liquid and expose the same to evaporation, passages or chambers formed directly in said porous material and means for supplying to said porous wall the liquid to be evaporated.

4. In a refrigerator, the combination of a storage-chamber having top and side walls of porous material adapted to absorb water and expose the same to evaporation, of an independent filter also formed of porous material, the bottom of which is adapted to be placed in direct contact with the top of the storage-chamber, whereby the water to be evaporated is drawn through the porous material of the filter by capillary attraction and evenly disseminated therefrom throughout said top and side walls.

JOHN B. MILLER.

Witnesses:
JAMES H. PEIRCE,
ALBERTA ADAMICK.